United States Patent
Güntherberg et al.

(10) Patent No.: US 6,531,543 B1
(45) Date of Patent: Mar. 11, 2003

(54) THERMOPLASTIC MOLDING COMPOSITIONS BASED ON ACRYLONITRILE-STYRENE-ACRYLATE POLYMERS

(75) Inventors: Norbert Güntherberg, Speyer (DE); Martin Weber, Maikammer (DE); Gerhard Lindenschmidt, Leimen (DE); Hans Peter Rath, Grünstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/913,121

(22) PCT Filed: Feb. 7, 2000

(86) PCT No.: PCT/EP00/00965
§ 371 (c)(1),
(2), (4) Date: Aug. 9, 2001

(87) PCT Pub. No.: WO00/47674
PCT Pub. Date: Aug. 17, 2000

(30) Foreign Application Priority Data

Feb. 12, 1999 (DE) .......................................... 199 06 065

(51) Int. Cl.⁷ ............................................... C08L 51/00
(52) U.S. Cl. ............................ 525/70; 525/71; 525/85; 525/86
(58) Field of Search ............................. 525/70, 71, 85, 525/86

(56) References Cited

U.S. PATENT DOCUMENTS 5,250,617 A   10/1993   Piejko
5,747,586 A   5/1998    Koehler

FOREIGN PATENT DOCUMENTS

DE   2020 478    11/1971
DE   42 11 482   8/1993
DE   198 17218   10/1999
EP   526 813     2/1993
EP   675 164     10/1995
EP   693 530     1/1996

OTHER PUBLICATIONS

Amoco Chem.Co./Bul, 12–N,Amoco Polybutene, The verstile ingredient for improved product performance and value.
D. D. Heinrich, 6/95,Acrylonitrile–butadiene–styrene modification using Amoco polybutene.
Dewent 59–1892/51.
Derwent 93–250706/32.
Dewent 71–713405.

*Primary Examiner*—Jeffrey Mullis
(74) *Attorney, Agent, or Firm*—Keil & Weinkauf

(57) ABSTRACT

Thermoplastic molding compositions, comprising
(A) from 20 to 99% by weight of at least one graft copolymer,
(B) from 1 to 80% by weight of a copolymer obtained from at least one alpha-olefin and from at least one polar comonomer, with the proviso that the monomers used are not vinyl acetate or any vinylaromatic monomer, and
(C) from 0 to 80% by weight of a thermoplastic polymer, obtained by polymerizing a monomer mixture, of
    (c1) from 50 to 100% by weight of at least one vinylaromatic monomer and/or of a $C_1$–$C_8$-alkyl (meth)acrylate, and
    (c2) 0 to 50% by weight of at least one monofunctional comonomer, and
(D) from 0.5 to 30% by weight of a (co)polymer made from
    (d1) from 50 to 100% by weight of isobutene and
    (d2) from 0 to 50% by weight of one or more other monomers,
process of preparing same and their uses.

17 Claims, No Drawings

THERMOPLASTIC MOLDING COMPOSITIONS BASED ON ACRYLONITRILE-STYRENE-ACRYLATE POLYMERS

The invention relates to thermoplastic molding compositions based on ASA (acrylonitrile-styrene-acrylate) and having improved flowability and improved extrusion properties. The invention further relates to a process for preparing these thermoplastic molding compositions and to their use, and also to films and moldings produced therefrom and to the use of these.

There is a wide variety of application sectors for thermoplastic molding compositions, and there is therefore a variety of known molding compositions with differing mixes for different application sectors.

EP-A 0 526 813 describes polymer blends for flexible films. These are made from a graft copolymer of vinyl monomers as graft shell on an acrylate rubber as graft base, a partially crosslinked copolymer rubber based on acrylate, an uncrosslinked polymer based on styrene compounds and/or on acrylic compounds and an ethylene-vinyl acetate copolymer. The plastic material which can be obtained, in which no PVC is present, is suitable for producing leather-like films. However, under molding conditions, to give films for example, these compositions tend to discolor undesirably. Films of this type also exhibit relatively severe fogging when processed by methods similar to those conventionally used.

DE-A 42 11 482 describes a surface film having one or more layers and made from a thermoplastic with good surface tension and good notch impact strength. The film has a very low level stress whitening. The "hard" component of the thermoplastic is a styrene-acrylonitrile (SAN) copolymer, and the "softer" component is an elastomer-modified styrene copolymer, in particular a rubber-grafted SAN copolymer. There may also be high-molecular-weight acrylates or acrylate copolymers present. This base film has an outer layer, for example made from polyacrylate, PVDF film, PVF film, polycarbonate film or polyester film. Conventional additives may also be present. However, the process to prepare graft polymers of this type is complicated, and it is therefore difficult to obtain consistent product quality. Nothing is said about the flow behavior of these molding compositions.

EP-A 0 693 530 describes impact-modified molding compositions based on polyisobutylene-containing polycarbonate. These molding compositions comprise an aromatic polycarbonate modified with polyisobutylene, a graft copolymer which has a core based on diene and/or on acrylate, and a shell made from styrene and acrylonitrile, for example, and, where appropriate, comprise another rubber and copolymer, and also, where appropriate, aromatic polycarbonate and polyolefins. The function of the polyisobutylene in these molding compositions is to provide molding compositions with particular high impact strength.

DE-A 20 20 478 teaches that polyisobutylene (=polyisobutene) improves the dielectric properties of molding compositions made from blends of thermoplastics.

The Amoco company publication "Amoco polybutenes", published in 1994, describes the properties of "Amoco polybutenes", isobutylene-butene copolymers whose precise makeup is not disclosed. Page 18 generally describes an improvement in the impact strength, elasticity and melt flow rate of a wide variety of thermoplastics.

The Amoco company publication "Acrylonitrile-butadiene-styrene modification using Amoco polybutenes" of June 1995 describes the use of the "Amoco polybutenes" mentioned in ABS and the effect on impact strength, flow rate, tensile strength and HDT (heat resistance) of adding "Amoco polybutene". This company publication relates exclusively to ABS (acrylonitrile-butadiene-styrene) polymers and to the effect of "Amoco polybutene" on the properties of these polymers. No indication can be found in this company publication of the extrusion properties of ABS polymers modified with "Amoco polybutenes".

EP-A 0 675 164 discloses thermoplastic molding compositions made from a graft copolymer and from a copolymer and, where appropriate, from a thermoplastic polymer, preferably SAN (styrene-acrylonitrile). These may readily be rolled to give films. However, flowability is too low for extrusion applications, in particular to give soft, reduced-gloss films.

The application with file reference number DE 198 17 218, which is not a prior publication, describes thermoplastic molding compositions which comprise a graft copolymer, a thermoplastic polymer, preferably SAN, and another copolymer made from styrene and/or α-methylstyrene, butadiene and, where appropriate, from one or more other monomers whose double bonds have been almost completely hydrogenated. To improve flowability, these thermoplastic molding compositions comprise isobutene or an isobutene copolymer. However, these molding compositions are not matt.

It is an object of the present invention, therefore, to provide molding compositions based on the thermoplastic molding compositions disclosed in DE 198 17 218 and having particularly good flowability and good extrusion properties and capable of reliable extrusion to give films or moldings with a soft, matt surface, with consistent product quality. A further object was to provide a process for preparing these thermoplastic molding compositions, and also the use of the molding compositions of the invention for producing moldings or films, or as coextrusion compositions.

Other objects are to provide films and moldings made from the molding compositions of the invention which have good and balanced mechanical properties, and the use of these.

We have found that this object is achieved, as are the other objects described, by way of thermoplastic molding compositions, essentially comprising (A) from 20 to 99% by weight of at least one graft copolymer, essentially obtainable from
  (a1) from 30 to 90% by weight of a core, obtainable by polymerizing a monomer mixture, essentially consisting of
    (a11) from 80 to 99.99% by weight of at least one $C_1$–$C_{10}$-alkyl acrylate,
    (a12) from 0.01 to 20% by weight of at least one copolymerizable, polyfunctional, crosslinking monomer, and
    (a13) from 0 to 40% by weight, based on the total weight of components (a11) and (a12), of at least one other copolymerizable, monoethylenically unsaturated monomer, and
  (a2) from 10 to 70% by weight of a graft shell, obtainable by polymerizing a monomer mixture in the presence of the core (a1), and essentially consisting of
    (a21) from 50 to 100% by weight of at least one styrene compound of the formula (I)

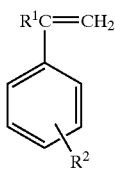

where $R^1$ and $R^2$, independently of one another, are hydrogen or $C_1$–$C_8$-alkyl and/or of a $C_1$–$C_8$-alkyl (meth)acrylate, and (a22) from 0 to 50% by weight of at least one monofunctional comonomer, and (B) from 1 to 80% by weight of a copolymer obtainable from at least one alpha-olefin and from at least one polar comonomer, with the proviso that the monomers used are not vinyl acetate or any vinylaromatic monomer, and (C) from 0 to 80% by weight of a thermoplastic polymer, obtainable by polymerizing a monomer mixture, essentially consisting of
  (c1) from 50 to 100% by weight of at least one vinylaromatic monomer and/or of a $C_1$–$C_8$-alkyl (meth)acrylate, and
  (c2) from 0 to 50% by weight of at least one monofunctional comonomer, and (D) from 0.5 to 30% by weight of a (co)polymer made from
  (d1) from 50 to 100% by weight of isobutene and
  (d2) from 0 to 50% by weight of one or more other monomers, where the overall total of components A to D is 100% by weight.

These molding compositions have excellent flowability and very good extrusion properties. They can be processed to give films or moldings with a soft, matt surface, with consistent product quality. The molding compositions of the invention are also suitable as soft coextrusion compositions with good flowability and reduced gloss.

The amount of component (A) present in the molding compositions of the invention, based on the total of components (A) to (D), is from 20 to 99% by weight, preferably from 30 to 98% by weight and particularly preferably from 50 to 95% by weight. This component is a particulate graft copolymer built up from an elastomeric graft core (a1) ("soft component") and, grafted onto this, a shell (a2) ("hard component").

The amount of the graft core (a1), based on component (A), is from 30 to 90% by weight, preferably from 35 to 80% by weight and particularly preferably from 40 to 75% by weight.

The graft core (a1) is obtained by polymerizing a monomer mixture made from, based on (a1),
  (a11) from 80 to 99.99% by weight, preferably from 90 to 99.85% by weight and particularly preferably from 97 to 99% by weight, of at least one $C_1$–$C_{10}$-alkyl acrylate,
  (a12) from 0.01 to 20% by weight, preferably from 0.2 to 10% by weight and particularly preferably from 0.5 to 5% by weight, of at least one crosslinking monomer, and
  (a13) from 0 to 40% by weight, preferably from 0 to 10% by weight, based on the total weight of components (a11) and (a12), of at least one other copolymerizable, monoethylenically unsaturated monomer.

Particularly suitable $C_1$–$C_{10}$-alkyl acrylates (component (a11)) are methyl acrylate, ethyl acrylate, propyl acrylate, n-butyl acrylate, n-pentyl acrylate, n-hexyl acrylate, n-heptyl acrylate, n-octyl acrylate, 2-ethylhexyl acrylate, n-nonyl acrylate and n-decyl acrylate, and also mixtures of these, particularly preferably ethyl acrylate, 2-ethylhexyl acrylate, n-butyl acrylate or mixtures of these, and very particularly preferably n-butyl acrylate.

The copolymerizable, polyfunctional crosslinking monomers (a12) used are generally those which contain two, three or four, preferably two, copolymerizable double bonds which are not 1,3-conjugated in. Examples of monomers of this type suitable for crosslinking are ethylene glycol diacrylate, ethylene glycol dimethacrylate, butanediol diacrylate, butanediol dimethacrylate, hexanediol diacrylate, hexanediol dimethacrylate, divinylbenzene, diallyl maleate, diallyl fumarate, diallyl phthalate, triallyl cyanurate, triallyl isocyanurate, tricyclodecenyl acrylate, dihydrodicyclopentadienyl acrylate, triallyl phosphate, allyl acrylate, allyl methacrylate and dicyclopentadienyl acrylate (DCPA) (cf. DE-C-12 60 135).

Other examples which may be mentioned of copolymerizable, monoethylenically unsaturated monomers (component (a13)) are butadiene, isoprene;
  vinylaromatic monomers, such as styrene or styrene derivatives of the formula I;
  methacrylonitrile, acrylonitrile;
  acrylic acid, methacrylic acid, dicarboxylic acids, such as maleic acid and fumaric acid, and also anhydrides of these, such as maleic anhydride;
  nitrogen-functional monomers, such as dimethylaminomethyl acrylate, dimethylaminoethyl acrylate, vinylimidazole, vinylpyrrolidine, vinylcaprolactam, vinylcarbazole, vinylaniline, acrylamide;
  $C_1$–$C_4$-alkyl methacrylates, such as methyl methacrylate, ethyl methacrylate, n-propyl methacrylate, isopropyl methacrylate, n-butyl methacrylate, isobutyl methacrylate, sec-butyl methacrylate and hydroxyethyl acrylate; aromatic or araliphatic (meth)acrylates, such as phenyl acrylate, phenyl methacrylate, 2-phenylethyl acrylate, 2-phenylethyl methacrylate, benzyl methacrylate, benzyl acrylate, 2-phenoxyethyl methacrylate and 2-phenoxyethyl acrylate;
  unsaturated ethers, such as vinyl methyl ether,
and also mixtures of these monomers.

The amount of the graft shell (a2) present, based on component (A), is from 70 to 10% by weight, preferably from 65 to 20% by weight, particularly preferably from 60 to 25% by weight, and it is obtainable by polymerizing a monomer mixture in the presence of the core (a1).

The graft shell (a2) is obtained by polymerizing a monomer mixture made from, based on (a2),
  (a21) from 50 to 100% by weight, preferably from 55 to 95% by weight, particularly preferably from 60 to 90% by weight, of at least one styrene compound of the formula (I)

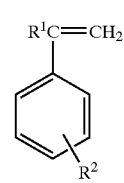

where $R^1$ and $R^2$, independently of one another, are hydrogen or $C_1$–$C_8$-alkyl and/or of a $C_1$–$C_8$-alkyl (meth)acrylate, and (a22) from 0 to 50% by weight, preferably from 45 to 5% by weight, particularly preferably from 40 to 10% by weight, of at least one monofunctional comonomer.

The styrene compound used of the formula (I) (component (a21)) is preferably styrene, α-methylstyrene or ring-$C_1$–$C_8$-alkyl-alkylated styrenes, such as p-methylstyrene or tert-butylstyrene, particularly preferably styrene or α-methylstyrene.

According to the invention, the $C_1$–$C_8$-alkyl (meth)-acrylates used are methyl methacrylate (MMA), ethyl methacrylate, n- or isopropyl methacrylate, n-butyl methacrylate, isobutyl methacrylate, sec-butyl methacrylate, tert-butyl methacrylate, pentyl methacrylate, hexyl methacrylate, heptyl methacrylate, octyl methacrylate or 2-ethylhexyl methacrylate, particularly preferably methyl methacrylate, or mixtures of these monomers, methyl acrylate (MA), ethyl acrylate, propyl acrylate, n-butyl acrylate, isobutyl acrylate, sec-butyl acrylate, tert-butyl acrylate, pentyl acrylate, hexyl acrylate, heptyl acrylate, octyl acrylate or 2-ethylhexyl acrylate, particularly preferably n-butyl acrylate, or else a mixture of these monomers with one another or with the methacrylates and/or styrene compounds of the formula I, where the amount of the acrylates in the graft shell is preferably subordinate.

Possible monofunctional comonomers (component (a22)) are monomers selected from the group consisting of methacrylonitrile, acrylonitrile and mixtures of these, N—$C_1$–$C_8$-alkyl-, N—$C_5$–$C_8$-cycloalkyl- and N—$C_6$–$C_{10}$-aryl-substituted maleimides, such as N-methyl-, N-phenyl-, N-dimethylphenyl- and N-cyclohexylmaleimide, and maleic anhydride. Acrylonitrile is preferred.

It is preferable for the graft shell (a2) to have been built up from styrene or from a mixture comprising from 65 to 85% by weight of styrene, the remainder being acrylonitrile.

In a preferred embodiment the graft shell (a2) is built up using a mixture of styrene (S) and acrylonitrile (AN) (molar ratio S/AN usually from 4.5:1 to 0.5:1, preferably from 2.2:1 to 0.65:1), styrene on its own, a mixture of acrylonitrile and methyl methacrylate (MMA) or MMA on its own.

Component (A) is prepared by methods known per se, for example as described in DE-A 31 49 358.

For this, the core (a1) is first prepared by polymerizing the acrylate(s) (a11) and the poly-functional crosslinking monomers (a12), if desired together with the other comonomers (a13), in usually aqueous emulsion, in a manner known per se at from 20 to 100° C., preferably from 50 to 80° C. Use may be made of the usual emulsifiers, such as alkali metal alkyl-or alkylarylsulfonates, alkyl sulfates, fatty alcohol sulfonates, salts of higher fatty acids having from 10 to 30 carbon atoms, sulfosuccinates, such as Aerosol® OT (Cyanamid), ether sulfonates, such as Disponil® FES61 (Henkel) or resin soaps (Dresinate). Preference is given to the use of the sodium or potassium alkylsulfonates, or of salts of fatty acids having from 10 to 18 carbon atoms.

The usual amounts of emulsifiers may be used. Advantageous amounts of emulsifiers are from 0.3 to 5% by weight, in particular from 1 to 2% by weight, based on the monomers used in preparing the core (a1).

The dispersion is preferably prepared using sufficient water to give the finished dispersion a solids content of from 20 to 60% by weight.

Preferred polymerization initiators are free-radical generators, for example peroxides, preferably peroxosulfates, such as potassium peroxodisulfate, and azo compounds, such as azodiisobutyronitrile. However, it is also possible to use redox systems, in particular those based on hydroperoxides, such as cumene hydro-peroxide. Concomitant use may also be made of from 0 to 3% by weight of molecular weight regulators, such as ethylhexyl thioglycolate, tert-dodecyl mercaptan, terpinols or dimeric α-methylstyrene.

The amount of the initiators generally depends on the desired molecular weight and is usually from 0.1 to 1% by weight, based on the monomers used in preparing the core (a1).

To maintain a constant pH, preferably from 6 to 9, buffer substances may be used as polymerization auxiliaries, for example $Na_2HPO_4/NaH_2PO_4$ or sodium hydrogencarbonate. The usual amounts of the buffer substances are used, and further details in this connection are therefore unnecessary.

The precise polymerization conditions, in particular the type, method of addition and amount of the emulsifier, are generally determined individually within the ranges given above in such a way as to give the resultant latex of the crosslinked acrylate polymer (a1) a $d_{50}$ of from 60 to 1000 nm, preferably from 80 to 800 nm, particularly preferably from 100 to 600 nm. The particle size distribution of the latex here should preferably be narrow.

The graft core (a1) may particularly preferably also be prepared by polymerizing the monomers (a11) to (a13) in the presence of a fine-particle latex made from elastomeric or hard polymers (seed-latex polymerization). The seed latex used may, for example, have been made from crosslinked poly-n-butyl acrylate or from polystyrene. It is also in principle possible to prepare the graft core (a1) by a process other than emulsion polymerization, e.g. by bulk or solution polymerization, and then to emulsify the resultant polymers. Microsuspension polymerization is also suitable, preferably using oil-soluble initiators, such as lauroyl peroxide or tert-butyl perpivalate. The processes for this are known.

In a preferred embodiment the core (a1) has a glass transition temperature below 0° C.

The graft-rubber particles (A) usually have a particle size ($d_{50}$) of from 60 to 1 500 nm, preferably from 100 to 1 200 nm.

In a particularly preferred embodiment, graft-rubber particles (A) with a particle size ($d_{50}$) of from 150 to 700 nm are used in order to give the molding composition high toughness.

In another preferred embodiment, a mixture of graft-rubber particles (A) of different sizes which has a bimodal particle size distribution is used. In a particularly preferred mixture of this type, from 0.5 to 99.5% by weight of the mixture has a particle size, as given by the average diameter ($d_{50}$), of from 200 to 1000 nm, and from 0.5 to 99.5% by weight of the mixture has a particle size, as given by the average diameter ($d_{50}$), of from 60 to 190 nm.

The chemical structure of the two graft polymers is preferably the same, although the shell of the coarse-particle graft polymer may in particular also have a two-stage structure.

The graft shell (component (a2)) is generally likewise prepared by known polymerization processes, such as emulsion, bulk, solution or suspension polymerization, preferably in aqueous emulsion in the presence of an aqueous emulsion of the core (a1) (see DE-A 12 60 135, DE-A 31 49 358 and DE-C 11 64 080). In a preferred embodiment, the graft copolymerization is carried out in a system which is the same as that used for the polymerization of the core (a1) with addition, if required, of further emulsifier and initiator. These do not have to be the same as the emulsifiers or initiators used for preparing the core (a1). The emulsifier, the initiator and the polymerization auxiliaries may each-be charged on their own or in a mixture to the dispersion of the core (a1) Any of the possible combinations of, on the one hand, charging and feeding and, on the other hand, initiator, emulsifier and polymerization auxiliaries may be used. Preferred embodiments are those known to the skilled worker. The monomer or, respectively, monomer mixture to be grafted on may be added to the reaction mixture all at once, batchwise in two or more stages or else continuously during the polymerization.

The amount of component (B) present in the molding compositions of the invention, based on the total of components (A) to (D), is from 80 to 1% by weight, preferably from 60 to 3% by weight, particularly preferably from 50 to 4% by weight.

Alpha-olefins used to prepare component (B) may be $C_2$–$C_8$-alpha-olefins, such as ethene, propene, 1-butene, 1-pentene, 1-hexene, 1-heptene or 1-octene, or mixtures of these, preferably ethene or propene.

Examples of polar comonomers, which according to the invention should not include vinyl acetate or vinylaromatic monomers, are:

alpha- or beta-unsaturated $C_3$–$C_8$ carboxylic acids and the available anhydrides of these, for example acrylic acid, methacrylic acid, maleic acid, maleic anhydride, fumaric acid, itaconic acid, and glyceride esters thereof and also esters with $C_1$–$C_8$-alkyl alcohols whose alkyl radicals may have monosubstitution by phenyl groups or by naphthyl groups, unsubstituted or mono- or di-$C_1$–$C_4$-alkyl-substituted phenol or naphthol, methyl methacrylate, ethyl methacrylate, n-butyl acrylate, isobutyl acrylate, pentyl acrylate, hexyl acrylate, 2-ethylhexyl acrylate, 2-ethylhexyl methacrylate, glycidyl methacrylate, phenyl acrylate, phenylethyl methacrylate, phenylethyl acrylate, benzyl methacrylate, benzyl acrylate, phenylpropyl methacrylate, phenylpropyl acrylate, phenylbutyl methacrylate, phenylbutyl acrylate, 4-methylphenyl acrylate, naphthyl acrylate, phenoxyethyl methacrylate and phenoxyethyl acrylate;

methacrylonitrile, acrylonitrile;

carbon monoxide.

In a preferred embodiment, copolymers used as component (B) can be prepared from (I) 40 to 75% by weight of ethylene, from 5 to 20% by weight of carbon monoxide and 20 to 40% by weight of n-butyl acrylate, for example the commercially available ELVALOY® HP-4051 (DuPont), or preferably from (II) 50 to 98.9% by weight of ethylene, 1 to 45% by weight of n-butyl acrylate and 0.1 to 20% by weight of (meth)acrylic acid and/or maleic anhydride or from (III) 96 to 67% by weight of ethylene, 1 to 20% by weight of n-butyl acrylate, 3 to 10% by weight of (meth)acrylic acid and 0 to 3% by weight of maleic anhydride.

The copolymers (B) are prepared in a manner known per se (see U.S. Pat. Nos. 2,897,183 and 5,057,593). They are usually prepared by free-radical polymerization. The initiators usually used are peroxides, such as lauroyl peroxide, tert-butyl peracetate, tert-butyl peroxy-pivalate, di-tert-butyl peroxide, di(sec-butyl) peroxy-dicarbonate, tert-butyl peroctanoate and tert-butyl perisononanoate, preferably tert-butyl peroxypivalate and tert-butyl perisononanoate. Initiators containing azo groups, such as azobisisobutyronitrile, are also suitable.

The choice of the suitable initiator usually depends on the polymerization temperature to be selected, which is generally from 100 to 300° C., preferably from 130 to 280° C. The pressure during the polymerization is usually selected within the range from 100 to 400 MPa, preferably from 150 to 250 MPa. The amount of initiator is generally chosen within the range from 1 to 50 mol, preferably from 2 to 20 mol, for each $10^6$ mol of polar copolymer used.

The polymerization is generally carried out in a continuously operating tubular reactor. A reactor of this type is described, for example, in U.S. Pat. No. 2,897,183. The reaction time is generally from 30 to 1 min, preferably from 5 to 2 min. The use of a solvent has hitherto been found to be optional.

The proportion of component (C) in the molding compositions is from 0 to 80% by weight, preferably from 5 to 60% by weight, particularly preferably from 10 to 30% by weight, based on the total of components (A) to (D). This polymer is obtainable by polymerizing a monomer mixture essentially consisting of (c1) from 50 to 100% by weight, preferably from 60 to 95% by weight, particularly preferably from 65 to 80% by weight, of at least one vinylaromatic-monomer and/or of a $C_1$–$C_8$-alkyl (meth)acrylate, and (c2) from 0 to 50% by weight, preferably from 0 to 40% by weight, particularly preferably from 5 to 35% by weight, of at least one monofunctional comonomer, based in each case on component (C).

The vinylaromatic monomer (component (c1)) used comprises styrene, the substituted styrenes of the formula (I) mentioned above as component (a21) or the $C_1$–$C_8$-alkyl (meth)acrylates mentioned under component (a21), preferably methyl methacrylate. Preference is given to the use of styrene, α-methylstyrene and p-methylstyrene.

Monomers which may be used as monofunctional comonomers (component (c2)) are those mentioned above as component (a22). The component (c2) used may also, if desired, be a mixture of the $C_1$–$C_8$-alkyl (meth)acrylates mentioned under component (a21) and the monomers mentioned under component (a21). Preference is given to monoethylenically unsaturated nitrile compounds, in particular acrylonitrile, methacrylonitrile and mixtures of these. Acrylonitrile is particularly preferred.

In a preferred embodiment, use is made of a mixture of styrene (S) and acrylonitrile (AN), S and α-methyl-styrene, if desired mixed with methyl methacrylate or with maleimides, or of methyl methacrylate, if desired with methyl acrylate. Particular preference is given to SAN polymers whose principal components are styrene and acrylonitrile.

The polymers of component (C) are generally known. In some cases they are also commercially available, or can be prepared by known methods (see Kunststoff-Handbuch, Vieweg-Daumiller, Vol. V (Polystyrol) [(Polystyrene)], Carl-Hanser-Verlag, Munich 1969, page 118 et seq.). The polymerization is generally carried out by a free-radical route in emulsion, or in suspension, solution or bulk, the latter two methods being preferred. The polymers (C) generally have viscosity numbers (VN) (measured to DIN 53 726 in a 0.5% strength solution in dimethylformamide at 25° C.) of from 40 to 160 ml/g, corresponding to average molar masses. $M_w$ of from 40 000 to 2 000 000.

The proportion of component (D) in the molding compositions, based on the total of components (A) to (D), is from 0.05 to 30% by weight, preferably from 0.1 to 20% by weight and in particular from 0.5 to 10% by weight. Component (D) is a copolymer which is composed of (d1) from 50 to 100% by weight, preferably from 70 to 100% by weight and in particular from 80 to 100% by weight, of isobutene and (d2) from 0 to 50% by weight, preferably from 0 to 30% by weight and in particular from 0 to 20% by weight, of one or more other monomers, in each case based on (D). Isobutene is also referred to as isobutylene.

Component (D) is preferably composed of
(d1) from 50 to 100% by weight of isobutene and
(d2) from 0 to 50% by weight of olefins or of styrene compounds of the formula I.

Comonomers (d2) which may be used are: butene, styrene, styrene compounds of the formula I, for example α-methylstyrene, isoprene, indene, butadiene, cyclopentadiene, and also vinyl- and vinylidene-terminated olefins and "internal olefins" having from 3 to 14 carbon atoms, such as 2-methyl-2-pentene and 2-methyl-1-pentene, 2,4,4-trimethyl-2-pentene and 2,4,4,-trimethyl-1-pentene, cis- and trans-2-butene, 1-butene, 1-hexene, 1-octene and 1-decene.

The polymers (D) are usually termed polyisobutene (polyisobutylene) PIB to reflect their main component isobutene (isobutylene). Depending on molecular weight they are generally viscous to oily at room temperature (average molecular weight $M_N$ from about 300 to 600), oily to highly tacky ($M_N$ from about 700 to 2 000), highly viscous to highly tacky ($M_N$ from about 2 000 to 10 000), highly viscous to low-tack ($M_N$ from about 10 000 to 120 000) to rubbery and elastomeric ($M_N$ from about 300 000 to 2 500 000).

Depending on the product properties desired, the component (D) used may be homopolyisobutenes or copolyisobutenes. The proportion of comonomer (d2) is preferably less than 20% by weight, based on (D), and it is particularly preferable to use a homopolyisobutene.

As mentioned above, the polyisobutenes are usually characterized by molecular weight (e.g. the number-average $M_N$). Polyisobutenes of very different molecular weights may be used as component (D), in particular those with average molecular weights $M_N$ in the range from 100 to 1 000 000, preferably from 100 to 100 000, in particular from 500 to 10 000.

The copolymers (D) are known and commercially available, e.g. as Glissopal® (BASF), Hyvis® and Ultravis® (BP) or Indopole® (Amoco).

The homopolyisobutenes or copolyisobutenes [component (D)] are generally prepared by cationic polymerization at low temperatures. These processes are known to the skilled worker and are described, for example, in U.S. Pat. No. 5,286,823 and in Kunststoff-Handbuch, Vol. VI Polyolefine, Carl Hanser Verlag Munich, 1969, and in Ullmanns Encyclopadie der Technischen Chemie, 4th edition, Vol. 19, p. 216.

Besides components (A), (B), (C) and (D), the thermoplastic molding compositions may also comprise additives, such as lubricants, mold-release agents, pigments, dyes, flame retardants, antioxidants, light stabilizers, fibrous or pulverulent fillers, fibrous or pulverulent reinforcing materials, and antistats, the amounts being those usual for these materials.

The invention further provides a process for preparing thermoplastic molding compositions in a manner known per se, by mixing, in a mixing apparatus, (A) from 20 to 99% by weight of at least one graft copolymer, essentially obtainable from
(a1) from 30 to 90% by weight of a core, obtainable by polymerizing a monomer mixture, essentially consisting of
(a11) from 80 to 99.99% by weight of at least one $C_1$–$C_{10}$-alkyl acrylate,
(a12) from 0.01 to 20% by weight of at least one copolymerizable, polyfunctional, crosslinking monomer, and
(a13) from 0 to 40% by weight, based on the total weight of components (a11) and (a12), of at least one other copolymerizable, monoethylenically unsaturated monomer, and
(a2) from 70 to 10% by weight of a graft shell, obtainable by polymerizing a monomer mixture in the presence of the core (a1), and essentially consisting of
(a21) from 50 to 100% by weight of at least one styrene compound of the formula (I)

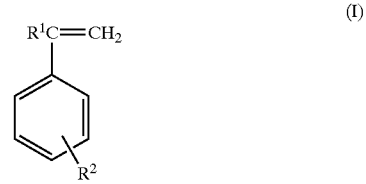

where $R^1$ and $R^2$, independently of one another, are hydrogen or $C_1$–$C_8$-alkyl and/or of a $C_1$–$C_8$-alkyl (meth)acrylate, and
(a22) from 0 to 50% by weight of at least one monofunctional comonomer, and (B) from 1 to 80% by weight of a copolymer obtainable from at least one α-olefin and from at least one polar comonomer, with the proviso that the monomers used are not vinyl acetate or any vinylaromatic monomer, and (C) from 0 to 80% by weight of a thermoplastic polymer, obtainable by polymerizing a monomer mixture, essentially consisting of
(c1) from 50 to 100% by weight of at least one vinylaromatic monomer and/or of a $C_1$–$C_8$-alkyl (meth)acrylate, and
(c2) from 0 to 50% by weight of at least one monofunctional comonomer, and (D) from 0.5 to 30% by weight of a copolymer made from
(d1) from 50 to 100% by weight of isobutene and
(d2) from 0 to 50% by weight of one or more other monomers, where the overall total of components A to D is 100% by weight;
and, where appropriate, conventional additives.

The molding compositions of the invention may be prepared by mixing processes known per se, for example by melting in a mixing apparatus, e.g. an extruder, Banbury mixer or kneader, or on a roll mill or calender at from 150 to 300° C. It is also possible, however, for the components to be mixed "cold" without melting and for the mixture, composed of powder or pellets, not to be melted and homogenized until it is processed.

The molding compositions of the invention may be used to produce moldings, films or fibers. The present invention therefore also provides the corresponding moldings, films and fibers.

The molding compositions of the invention are also suitable for use as coextrusion compositions which have good flowability and reduced gloss, and for use for coating sheets and/or profiles, and for use for producing soft/hard composites by two-component injection molding.

The molding compositions of the invention may be used to produce moldings of any type, in particular films. The films may be produced by extrusion, rolling, calendering or other processes known to the skilled worker, usually at from 150 to 280° C. Preference is given to the production of films from the molding compositions via extrusion. The molding compositions of the invention are molded here by heating and/or friction, on their own or with concomitant use of plasticizing or other additives, to give a processible film. Examples of equipment suitable for this purpose are extruders with slot dies. The films usually have a thickness of from 0.05 to 2 mm. An example of a process used to make finished products from films of this type is thermoforming, usually at from 120 to 170° C.

In a preferred embodiment, leather-like films are produced by mixing (A) from 20 to 99% by weight of at least one graft copolymer, essentially obtainable from
  (a1) from 30 to 90% by weight of a core, obtainable by polymerizing a monomer mixture, essentially consisting of.
    (a11) from 80 to 99.99% by weight of n-butyl acrylate, and
    (a12) from 20 to 0.01% by weight of tricyclodecenyl acrylate, and
  (a2) from 70 to 10% by weight of a graft shell, obtainable by polymerizing a monomer mixture in the presence of the core (a1), and essentially consisting of
    (a21) from 60 to 90% by weight of styrene and
    (a22) from 40 to 10% by weight of acrylonitrile, and
(B) from 1 to 80% by weight of a copolymer, prepared from from 67 to 96% by weight of ethylene, from 1 to 20% by weight of n-butyl acrylate, from 3 to 10% by weight of (meth)acrylic acid, and from 0 to 3% by weight of maleic anhydride, and
(C) from 0 to 80% by weight, based on the total weight of the components (A), (B), (C) and (D), of a copolymer, prepared by continuous solution polymerization of
  (c1) from 65 to 85% by weight of styrene and
  (c2) from 15 to 35% by weight of acrylonitrile, and
(D) from 0.5 to 30% by weight of a (co)polymer prepared from
  (d1) from 50 to 100% by weight of isobutene and
  (d2) from 0 to 50% by weight of olefins or styrene compounds of the formula I,
where the overall total of components A to D is 100% by weight,
and then calendering or extruding to give films.

The molding compositions of the invention may also be used for coextrusion together with other polymers, giving coextruded moldings or coextruded films. Examples of these other polymers are ABS. (acrylo-nitrile-butadiene-styrene polymers), PBT (polybutylene terephthalate), ASA (acrylonitrile-styrene-acrylate), PVC (polyvinyl chloride), SAN (styrene-acrylonitrile copolymers), MABS (methyl methacrylate-acrylonitrile-butadiene-styrene polymers), polymethyl methacrylate, polycarbonate and others.

Coextruded sheets may be further processed by thermoforming, for example for use in the sanitary sector or in the decorative sector (furniture surfaces etc.).

The films have a variety of applications, in particular in the automotive industry in the design of automotive interiors, for decorative purposes, as a leather substitute in the production of suitcases or bags, and in the furniture industry as a covering material for lamination to furniture surfaces.

The present invention also provides the use of films with a leather-like appearance for the internal fitting-out of utility vehicles, aircraft, ships or trains and in the furniture sector.

The molding compositions of the invention are equally suitable for processing by injection molding, either on their own to produce soft moldings or else in combination with hard thermoplastics to produce hard/soft composites, such as gasket lips or grip sections of consumer articles with "soft touch".

The thermoplastic molding compositions of the invention are preferably halogen-free. They are very sub-stantially free from constituents which escape by evaporation or bleed out, and exhibit practically no disadvantageous changes during processing, for example discoloration. In particular, even without the concomitant use of appropriate stabilizers or other additives, they have excellent heat-aging resistance and light resistance, and also good mechanical properties.

In particular, the molding compositions of the invention feature good flowability, especially when processed by extrusion. The good extrusion properties of the molding compositions bring about very consistent product quality of the films.

EXAMPLES

The following constituents were prepared (all percentages given are by weight):
Preparation of a Component A
Particulate graft copolymer made from crosslinked poly-n-butyl acrylate (core) and styrene-acrylonitrile copolymer (shell)

A mixture made from 98 g of n-butyl acrylate and 2 g of dihydrodicyclopentadienyl acrylate and also, separately, a solution of 1 g of Na $C_{12}$–$C_{18}$-paraffin-sulfonate in 50 g of water were added at 60° C. over the course of 4 hours to a mixture made from 3 g of a polybutyl acrylate seed latex, 100 g of water and 0.2 g of potassium persulfate. The polymerization was then continued for a further 3 hours. The average particle diameter $d_{50}$ of the resultant latex was 430 nm with a narrow particle size distribution (Q=0.1).

150 g of this latex were mixed with 60 g of water, 0.03 g of potassium persulfate and 0.05 g of lauroyl peroxide, and then firstly 20 g of styrene were grafted at 65° C. onto the latex particles over the course of 3 hours, followed by a mixture of 15 g of styrene and 5 g of acrylonitrile over the course of a further 4 hours. The polymer was then precipitated by a calcium chloride solution at 95° C., separated off, washed with water and dried in a stream of warm air. The degree of grafting in the polymer was 35% and the average diameter $d_{50}$ of the particles was 510 nm.

The makeup of the graft copolymer was as follows (rounded values):

65% by weight of a graft core made from polybutyl acrylate, crosslinked,

15% by weight of an inner graft made from styrene polymer, and

20% by weight of an outer graft made from styrene-acrylonitrile copolymer with an S/AN weight ratio of 3:1.

The seed polymer used at the outset was prepared by the process of EP-B 6503 (column 12, line 55 to column 13, line 22) by polymerizing n-butyl acrylate and tricyclo-decenyl acrylate in aqueous emulsion, and had a solids content of 40%.

The average particle size mentioned in describing component (A) is the weight-average of the particle sizes.

The average diameter is the $d_{50}$, denoting that 50% by weight of all the particles have a smaller diameter, and 50% by weight a larger diameter, than the diameter corresponding to the $d_{50}$. To characterize the breadth of the particle size distribution, the $d_{10}$ and $d_{90}$ values are frequently given in addition to the $d_{50}$. 10% by weight of all the particles are smaller, and 90% by weight are larger, than the $d_{10}$ diameter. In a similar way, 90% by weight of all of the particles have a smaller diameter, and 10% by weight a larger diameter, than the diameter corresponding to the $d_{90}$. The quotient $Q=(d_{90}-d_{10})/d_{50}$ is a measure of the breadth of the particle size distribution. A smaller Q indicates a narrower distribution.

Component B

A copolymer was prepared from 67–96% by weight of ethylene, 1–20% by weight of n-butyl acrylate, 3–10% by weight of acrylic acid and 0–3% by weight of maleic anhydride.

Preparation of a Component C

Copolymer made from styrene and acrylonitrile

A copolymer made from 65% by weight of styrene and 35% by weight of acrylonitrile (component C) was prepared by continuous solution polymerization, as described in Kunststoff-Handbuch, ed. R. Vieweg und G. Daumiller, Vol. V "Polystyrol" ["Polystyrene"], Carl-Hanser-Verlag Munich 1969, pp. 122–124. The viscosity number VN (determined in accordance with DIN 53 726 at 25° C., 0.5% by weight in dimethylformamide) was 60 ml/g.

Component D

Homopolyisobutene

Use was made of a commercially available homopolyisobutene with an average molecular weight (number-average $M_N$) of 2 400. Preparation is described in U.S. Pat. No. 5,286,823.

Molding Compositions Prepared and their Properties

Components A to D were intimately mixed, with melting, at 240° C. and 250 rpm in a Werner+Pfleiderer ZSK30 twin-screw extruder, discharged and pelletized. The pellets were extruded in a Rheocord 90 single-screw 3:1 Haake extruder at 220° C. and from 160 to 220 rpm to give a film of thickness 0.6 mm, using a slot die with 0.5 mm gap.

The following properties were determined for the films:

Tensile strength: the tensile test was undertaken to DIN 53 504 on strips stamped out from the film.

Elongation at break: elongation at ultimate tensile stress was determined in the tensile test to DIN 53 504 and given in % of the initial dimension of the strip.

Tear propagation resistance: a tear propagation test was undertaken to DIN 43 515 on strips stamped out from the material.

Shore hardness: the Shore hardness was determined to DIN 43 505 using test apparatus D.

Heat resistance: determined to DIN 53 406 as Vicat value using test method A.

The flowability of the molding compositions was determined on pellets, by measuring the melt volume rate (MVR) at 220° C. or 200° C. with a load of 10 kp or 21.6 kp. The amount discharged from a standard die in 10 min is given in ml.

The mixes for the films produced and the results of the tests are given in Table 1.

TABLE 1

| Experiment 1 Component | 1 V* | 2 V* | 3 V* | 4 | 5 | 6 | 7 |
|---|---|---|---|---|---|---|---|
| A(ASA)/pts. by wt. | 70 | 70 | 70 | 70 | 70 | 70 | 70 |
| B/pts. by wt. | 10 | 15 | 20 | 15 | 20 | 20 | 20 |
| C(SAN)/pts. by wt. | 20 | 15 | 10 | 15 | 10 | 10 | 10 |
| D1/pts. by wt. | — | — | — | 5 | 2 | 3 | 5 |

TABLE 1-continued

| Experiment 1 Component | 1 V* | 2 V* | 3 V* | 4 | 5 | 6 | 7 |
|---|---|---|---|---|---|---|---|
| MVR 220/10 | <0.2 | 0.46 | 0.66 | 2.5 | 2.1 | 4.0 | 6.1 |
| MVR 200/21.6/ml/10 min | 6.3 | 10.5 | 15.9 | 24.6 | 30.4 | 39.6 | 44.4 |
| MVR 220/21.6/ml/10 min | 15.7 | 21.6 | 38.7 | 68.9 | 44 | 53 | 93 |
| Vicat A/° C. | 94.3 | 82.7 | 71.4 | 80.2 | 66 | 64 | 61 |
| Shore D/° | 50 | 44.6 | 40.1 | 42.3 | 39.4 | 37 | 36 |
| Tensile strength N/mm² | 14.4 | 16.0 | 13.2 | 12.3 | 12.5 | 12 | 11 |
| Elongation at break/% | 105 | 144 | 188 | 133 | 174 | 172 | 152 |
| Tear propagation resistance/N/mm | 56.4 | 50.3 | 39 | 41.6 | 38 | 35 | 33 |

*Experiments 1, 2, and 3 are comparative.

As content of B rises, the composition becomes more flowable and softer and has better elongation at break, while tensile strength and tear propagation resistance decrease, and the Vicat value particularly decreases. The improvement in flowability produced by 5% of component D is much more marked than that produced by a change of 5% in component B. There is markedly less effect on the Vicat softening point, but tensile strength and elongation at break decrease. Shore hardness is shifted to markedly lower values as the amount of D increases, i.e. the molding composition becomes softer.

The composition is intrinsically particularly suitable for film applications. The composition with component D is particularly suitable for applications with coextrusion onto a backing, in particular for "soft coatings" on hard backings. The surface thus applied is relatively soft, easy-grip and matt. The composition is also suitable for producing soft/hard composites by two-component injection molding.

We claim:

1. A thermoplastic molding composition comprising (A) from 20 to 99% by weight of at least one graft copolymer, obtained from
   (a1) from 30 to 90% by weight of a core, obtained by polymerizing a monomer mixture, consisting essentially of
      (a11) from 80 to 99.99% by weight of at least one $C_1$–$C_{10}$-alkyl acrylate,
      (a12) from 0.01 to 20% by weight of at least one copolymerizable, polyfunctional, crosslinking monomer, and
      (a13) from 0 to 40% by weight, based on the total weight of components (a11) and (a12), of at least one other copolymerizable, monoethylenically unsaturated monomer, and
   (a2) from 10 to 70% by weight of a graft shell, obtained by polymerizing a monomer mixture in the presence of the core (a1), and consisting essentially of
      (a21) from 50 to 100% by weight of at least one styrene compound of the formula (I)

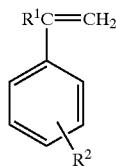

where $R^1$ and $R^2$, independently of one another, are hydrogen or $C_1$–$C_8$-alkyl and/or of a $C_1$–$C_8$-alkyl (meth)acrylate, and (a22) from 0 to 50% by weight of at least one monofunctional comonomer, and (B) from 1 to 80% by weight of a copolymer obtained from at least one alpha-olefin and from at least one polar comonomer, with the proviso that the monomers used are not vinyl acetate or any vinylaromatic monomer, and (C) from 0 to 80% by weight, based on the total weight of components (A), (B), (C) and (D), of a thermoplastic polymer, obtained by polymerizing a monomer mixture consisting essentially of (c1) from 50 to 100% by weight of at least one vinylaromatic monomer and/or of a $C_1$–$C_8$-alkyl (meth)acrylate, and (c2) from 0 to 50% by weight of at least one monofunctional comonomer, and (D) from 0.5 to 30% by weight of a (co)polymer made from (d1) from 50 to 100% by weight of isobutene and (d2) from 0 to 50% by weight of one or more other monomers, where the overall total of components A to D is 100% by weight.

2. A thermoplastic molding composition as claimed in claim 1, wherein the particle size of the graft copolymers (A) as given by the average diameter ($d_{50}$) is form 60 to 1500 nm.

3. A thermoplastic molding composition as claimed in claim 2, wherein the particle size as given by the average diameter ($d_{50}$) is from 150 to 700 nm.

4. A thermoplastic molding composition as claimed in claim 1, wherein the particle size distribution of component (A) is bimodal.

5. A thermoplastic molding composition as claimed in claim 4, wherein the component (A) used comprises a mixture of from 0.5 to 99.5% by weight of a graft copolymer (A) whose particle size as given by the average diameter ($d_{50}$) is from 200 to 1000 nm and from 99.5 to 0.5% by weight of a graft copolymer (A) whose particle size as given by the average diameter ($d_{50}$) is from 60 to 190 nm.

6. A thermoplastic molding composition as claimed in claim 1 wherein the glass transition temperature of the core (a1) is selected to be below 0° C.

7. A thermoplastic molding composition as claimed in claim 1 wherein component (D) is composed of (d1) from 50 to 100% by weight of isobutene and (d2) from 0 to 50% by weight of olefins or of styrene compounds of the formula I.

8. A thermoplastic molding composition as claimed in claim 7, wherein component (D) is a homopolyisobutene.

9. A process for preparing the thermoplastic molding compositions of claim 1 which comprises mixing components (A), (B) and (D) and optionally (C), and optionally with additives in a mixing apparatus.

10. A process for the production of films comprising the step of extruding, rolling or calendering the thermoplastic molding composition as claimed in claim 1.

11. A film obtained by a process as claimed in claim 10.

12. A process for producing soft moldings comprising the step of injection molding the thermoplastic molding compositions as claimed in claim 1.

13. A soft molding obtained by a process as claimed in claim 12.

14. A process for preparing coextruded moldings or coextruded films comprising the step of coextruding the thermoplastic compositions claimed in claim 1 together with other polymers.

15. A process for producing hard/soft composites comprising the step of injection molding the thermoplastic molding composition as claimed in claim 1 in combination with hard thermoplastics.

16. A process for preparing coated sheets and/or profiles comprising the step of coating sheets and/or profiles with the thermoplastic molding compositions as claimed in claim 1.

17. A film with the appearance of leather, produced by mixing (A) from 20 to 99% by weight of at least one graft copolymer, obtained from (a1) from 30 to 90% by weight of a core, obtained by polymerizing a monomer mixture, consisting essentially of (a11) from 80 to 99.99% by weight of n-butyl acrylate, and (a12) from 20 to 0.01% by weight tricyclodecenyl acrylate, and (a2) from 70 to 10% by weight of a graft shell, obtained by polymerizing a monomer mixture in the presence of the core (a1), and consisting essentially of (a21) from 60 to 90% by weight of styrene and (a22) from 40 to 10% by weight of acrylonitrile, and (B) from 80 to 1% by weight of a copolymer prepared from from 96 to 67% by weight of ethylene, from 1 to 20% by weight of n-butyl acrylate, from 3 to 10% by weight of (meth)acrylic acid, and from 0 to 3% by weight of maleic anhydride and (C) from 0 to 80% by weight of a copolymer, prepared by continuous solution polymerization of (c1) from 65 to 85% by weight of styrene, and (c2) from 15 to 35% by weight of acrylonitrile, and (D) from 0.5 to 30% by weight of a (co)polymer prepared from (d1) from 50 to 100% by weight of isobutene and (d2) from 0 to 50% by weight of olefins or of styrene compounds of the formula I, where the overall total of components A to D is 100% by weight, and then calendaring or extruding to give a film.

* * * * *